United States Patent
Dunne et al.

(10) Patent No.: US 11,190,467 B2
(45) Date of Patent: Nov. 30, 2021

(54) MICRO-TERM MODELLING FOR REAL TIME CHAT DISCOURSE

(71) Applicant: INTERNATIONAL BUSINESS MACHINES CORPORATION, Armonk, NY (US)

(72) Inventors: Jonathan Dunne, Dungarvan (IE); Jin Jing Xie, Beijing (CN); Hua Shao, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 82 days.

(21) Appl. No.: 16/205,936

(22) Filed: Nov. 30, 2018

(65) Prior Publication Data
US 2020/0175112 A1    Jun. 4, 2020

(51) Int. Cl.
*H04L 12/58*     (2006.01)
*G06F 40/30*     (2020.01)

(52) U.S. Cl.
CPC ............ *H04L 51/04* (2013.01); *G06F 40/30* (2020.01); *H04L 51/16* (2013.01)

(58) Field of Classification Search
CPC ...................................................... H04L 51/04
See application file for complete search history.

(56) References Cited

U.S. PATENT DOCUMENTS

| | | | |
|---|---|---|---|
| 8,626,832 B2 | 1/2014 | Jerrard-Dunne et al. | |
| 8,832,212 B1* | 9/2014 | Shah .................. | H04L 51/04 709/206 |
| 9,195,739 B2 | 11/2015 | Imig et al. | |
| 9,560,152 B1* | 1/2017 | Jamdar .................. | H04L 67/22 |
| 9,686,367 B2 | 6/2017 | Sundstrom | |
| 9,813,495 B1 | 11/2017 | Van Rensburg et al. | |
| 2006/0029106 A1* | 2/2006 | Ott ........................ | H04L 67/306 370/522 |
| 2007/0168447 A1* | 7/2007 | Chen .................... | G06Q 10/107 709/207 |
| 2009/0106686 A1* | 4/2009 | Shin .................... | G06F 3/04855 715/781 |

(Continued)

FOREIGN PATENT DOCUMENTS

WO      02093414 A1    11/2002

OTHER PUBLICATIONS

"Why Zulip?" [online] retrieved Jun. 28, 2018, retrieved from the Internet: <https://zulipchat.com/why-zulip/>, 7 pg.

(Continued)

*Primary Examiner* — Shaun Roberts
(74) *Attorney, Agent, or Firm* — Cuenot, Forsythe & Kim, LLC (57) ABSTRACT

Micro-term modeling for chat discourse includes determining, using computer hardware, a role of a user and a domain of reference of the user based on electronic chat messages for the user across a plurality of group chats, determining, using the computer hardware, topics from a selected group chat in which the user is a participant, determining, using the computer hardware and from the selected group chat, a segment of interest to the user based on the role, the domain of reference, and the topics found in the selected group chat, and providing, using the computer hardware, an indicator of the segment of interest.

15 Claims, 6 Drawing Sheets

(56) References Cited

U.S. PATENT DOCUMENTS

| | | |
|---|---|---|
| 2012/0023113 A1 | 1/2012 | Ferren et al. |
| 2014/0129331 A1 | 5/2014 | Spivack et al. |
| 2014/0222528 A1 | 8/2014 | Chang et al. |
| 2015/0169208 A1* | 6/2015 | Cho ............... G06Q 10/107 715/752 |
| 2016/0205254 A1* | 7/2016 | Luers ............... H04M 3/5232 379/265.14 |
| 2016/0239581 A1* | 8/2016 | Jaidka ............... H04L 51/32 |
| 2017/0134329 A1* | 5/2017 | Edgar ............... H04L 51/26 |
| 2018/0262803 A1* | 9/2018 | Benedetto ........ H04N 21/25891 |

OTHER PUBLICATIONS

Kang, L. et al., "Neural matching models for question retrieval and next question prediction in conversation," arXiv preprint arXiv:1707.05409, Jul. 17, 2017, 7 Pg.

* cited by examiner

Monitor attentiveness of user with respect to chat client or particular group chat
702

Determine that segment of interest to user is taking place or is likely to occur in immediate future
704

Determine that user is not attentive to chat client and/or to particular group chat
706

Provide notification to user
708

Determine a role of the user and a domain of reference of the user based on extracted electronic chat messages from a plurality of group chats involving the user
802

Determine topics from selected group chat involving the user
804

Determine a segment of interest for the user based on the role, the domain of reference, and the topics found in the group chat
806

Provide an indicator of the segment of interest.
808

MICRO-TERM MODELLING FOR REAL TIME CHAT DISCOURSE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This disclosure relates to chat technology and, more particularly, to micro-term modelling for real time chat discourse.

Real time chat discourse applications enjoy widespread use in many areas of life. In the workplace, for example, users rely heavily on chat applications to communicate with co-workers. Users are able to join different group chats to discuss various work-related projects and/or responsibilities. Use of chat applications, however, is not limited to the workplace. Chat applications also enjoy widespread acceptance in social systems and/or networks. Chat applications can be particularly useful in cases where the participants in a given group chat are geographically dispersed. Regardless of the context, group chats facilitate ongoing conversations that often continue for long periods of time, e.g., hours, days, or weeks. Further, the group chats may include conversations that cover a wide range of topics.

SUMMARY

In one or more embodiments, a method includes determining, using computer hardware, a role of a user and a domain of reference of the user based on electronic chat messages for the user across a plurality of group chats, determining, using the computer hardware, topics from a selected group chat in which the user is a participant, determining, using the computer hardware and from the selected group chat, a segment of interest to the user based on the role, the domain of reference, and the topics found in the selected group chat, and providing, using the computer hardware, an indicator of the segment of interest.

In one or more embodiments, a system includes a processor configured to initiate executable operations. The executable operations include determining a role of a user and a domain of reference of the user based on electronic chat messages for the user across a plurality of group chats, determining topics from a selected group chat in which the user is a participant, determining, from the selected group chat, a segment of interest to the user based on the role, the domain of reference, and the topics found in the selected group chat, and providing an indicator of the segment of interest.

In one or more embodiments, a computer program product includes a computer readable storage medium having program code stored thereon. The program code is executable by a processor to initiate executable operations. The executable operations include determining a role of a user and a domain of reference of the user based on electronic chat messages for the user across a plurality of group chats, determining topics from a selected group chat in which the user is a participant, determining, from the selected group chat, a segment of interest to the user based on the role, the domain of reference, and the topics found in the selected group chat, and providing an indicator of the segment of interest.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to chat technology and, more particularly, to micro-term modelling for real time chat discourse. Group chat applications have become an important means of communication both socially and in the workplace. A significant amount of discussion and/or decision making occurs within group chat applications. Situations do arise where a user participating in a group chat is unable to participate in the group for a period of time. In some cases, the user is temporarily prevented from participating in the group chat whether due to being momentarily distracted or having to attend to a more urgent matter. In other cases, the user is unable to participate in the group chat for a longer period of time. For example, the user may be on vacation, out sick, or on medical leave. In any case, the user may miss out on some portion or portions of the conversation taking place in the group chat that are of interest or important to the user.

Typically, so much decision making takes place through group chats that, in order to determine the current state of affairs for a given workgroup or project, a user (e.g., a participant in the group chat) that does miss out on portion(s) of the conversation in the group chat must scroll back through the history of the group chat and read the conversations to determine what transpired and/or the outcome. While the conversations may include important information of which the user should be aware, the history often includes a significant amount of information that, while relevant to other participants, is not relevant to the user. Still, the user must scroll back through the entire history or at least significant portions of the history of the group chat including relevant and irrelevant material to determine information of interest. This can be time consuming for the user.

In accordance with the inventive arrangements disclosed within this specification, a system is capable of analyzing content of group chats to indicate those portions of the group chat that are of interest to a user. The system is capable of analyzing communications of a user to determine information such as the role of the user within an organization, whether a work organization or social group, and the domain of reference for the user. Rather than rely on static designations of role or domain of reference, e.g., from looking up one's position and other information from an organizational chart database, the system determines the user's role and domain of reference in a dynamic manner through analysis of communications of the user.

The system is also capable of analyzing a group chat in which the user is participating. The system is capable of identifying different topics in the group chat. For example, from an analysis of the electronic chat messages in the group chat, the system is capable of recognizing topics in the group chat and assigning different ones of the electronic chat messages of the group chat to different ones of the topics. Based on an evaluation and/or comparison of the topics identified in the conversation, the role of the user, and the domain of reference of the user, the system is capable of determining segments of the group chat that are of interest to the user. The system is capable of indicating the segments of interest to the user through the user's chat client application and/or device.

The term "group chat" refers to a chat session between two or more users. Users in the group chat are also referred to as "participants". Further, participants in a group chat are typically invited to participate in the group chat as opposed to an open public forum where users are able to join and/or post messages without restriction or invitation. In some cases, group chats are also referred to as "channels". The term "segment", as use herein, means one or more electronic chat messages of a chat group that have been determined to be of interest to a particular user that is a participant in a selected group chat.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
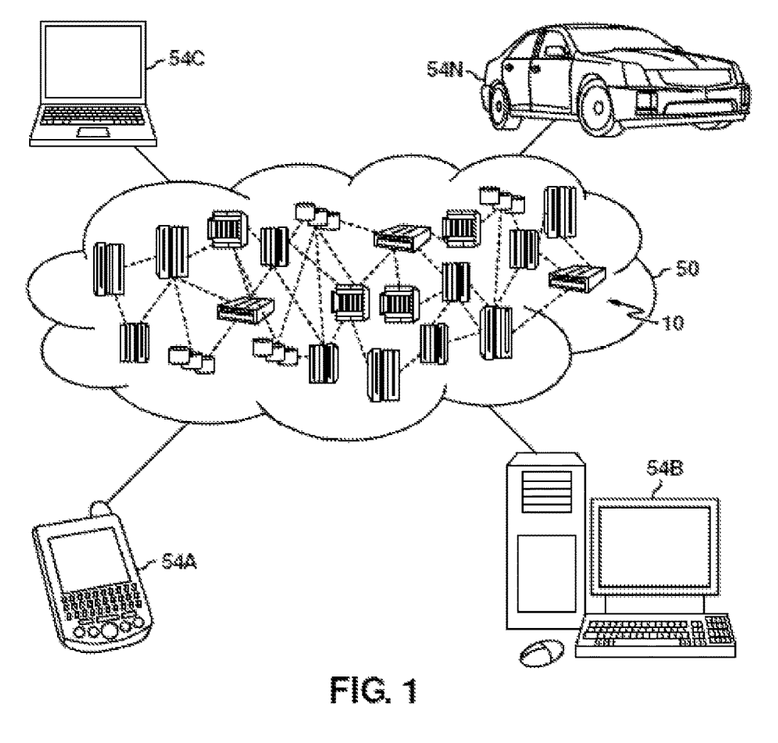
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
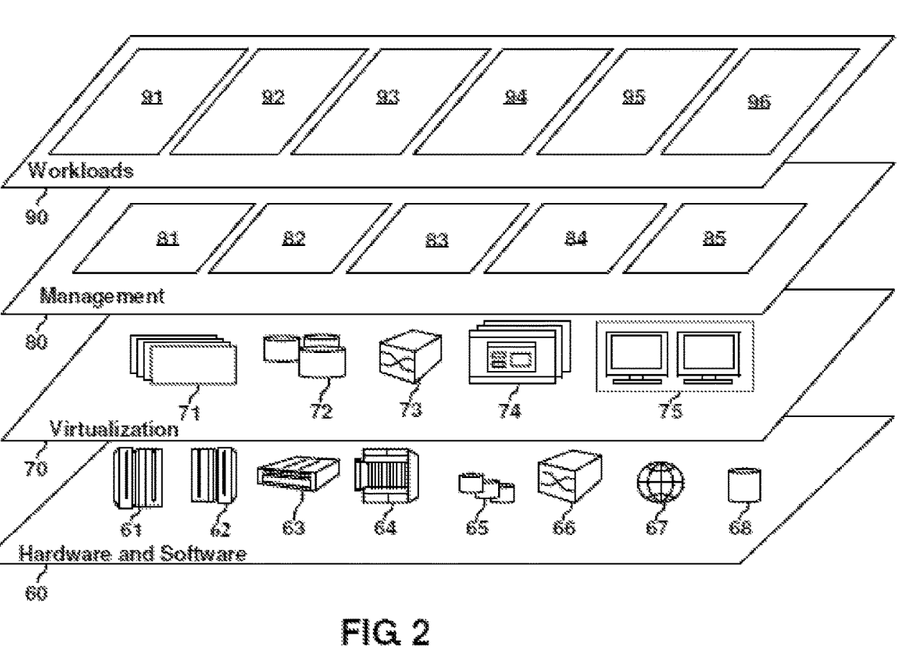
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and group chat modeling system 96.

In one or more embodiments, group chat modeling system 96 is capable of analyzing a conversation taking place in a group chat of which a user is a participant and determining one or more segments of interest to the user from the group chat. As an illustrative and nonlimiting example, the group chat modeling system 96 is capable of extracting electronic chat messages of a user from conversations across a plurality of group chats in which the user is a participant. The group chat modeling system 96 is capable of determining one or more roles of the user based on the extracted electronic chat messages. The group chat modeling system 96 is also capable of determining one or more domains of reference of the user based on the extracted electronic chat messages. A domain of reference is an area or a subject matter expertise, skill, or experience for the user. The system is further capable of processing a selected group chat in which the user is a participant to identify topics from the electronic chat messages in the selected group chat. The group chat modeling system 96 can determine one or more segments of interest to the user from the selected group chat based on the role(s), the domain(s) of interest, and the topics found in the selected group chat. The group chat modeling system 96 is further capable of providing an indicator of the segment(s) of interest.

In one or more embodiments, indicators for segments of interest in a conversation can be displayed within the user's chat client. For example, the indicators can be used to mark prior electronic chat messages in the group chat that are part of, or included in, the determined segments of interest. The indicators provide the user with a location of those segments of interest in the history of the selected group chat that are of interest to the user, thereby allowing the user to quickly navigate to each such segment and read only those segments that have been identified rather than the entire history of the group chat. As such, the user need not scroll through a much larger collection of prior sent electronic chat messages to determine content or items of interest in the conversation that the user may have missed.

In one or more embodiments, the group chat modeling system 96 is also capable of evaluating whether the user is being attentive to a given group chat. The group chat modeling system 96 is capable of using various techniques such as gaze detection, detecting the active window on the user's device (e.g., the window of the user's chat client application), and/or detecting which group chat within the group chat application of the user is selected or active to determine whether the user is attentive to a given conversation. The group chat modeling system 96 is capable of determining whether a current state of the conversation (e.g., based on the currently exchanged and/or the most recently exchanged electronic chat messages) is of interest to the user. The group chat modeling system 96 is capable of providing a notification to the user to obtain the user's attention in response to determining that the current state of the conversation is of interest to the user. In particular embodiments, the group chat modeling system 96 is capable of providing the notification to the user only in response to determining that the current state of the group chat is of interest to the user and that the user is not attentive to the group chat application or to the particular group chat within the group chat application.

In one or more other embodiments, the group chat modeling system 96 is capable of predicting whether future electronic chat messages in a group chat will be of interest to the user. In response to predicting that future electronic chat messages (e.g., in the near term and/or immediate future) in a group chat will be of interest to the user, the group chat modeling system 96 is capable of providing a notification to the user. In particular embodiments, the group chat conversation modeling system 96 is capable of providing the notification to the user only in response to predicting that future electronic chat messages in the group will be of interest to the user and that the user is not being attentive.

Figure 3:
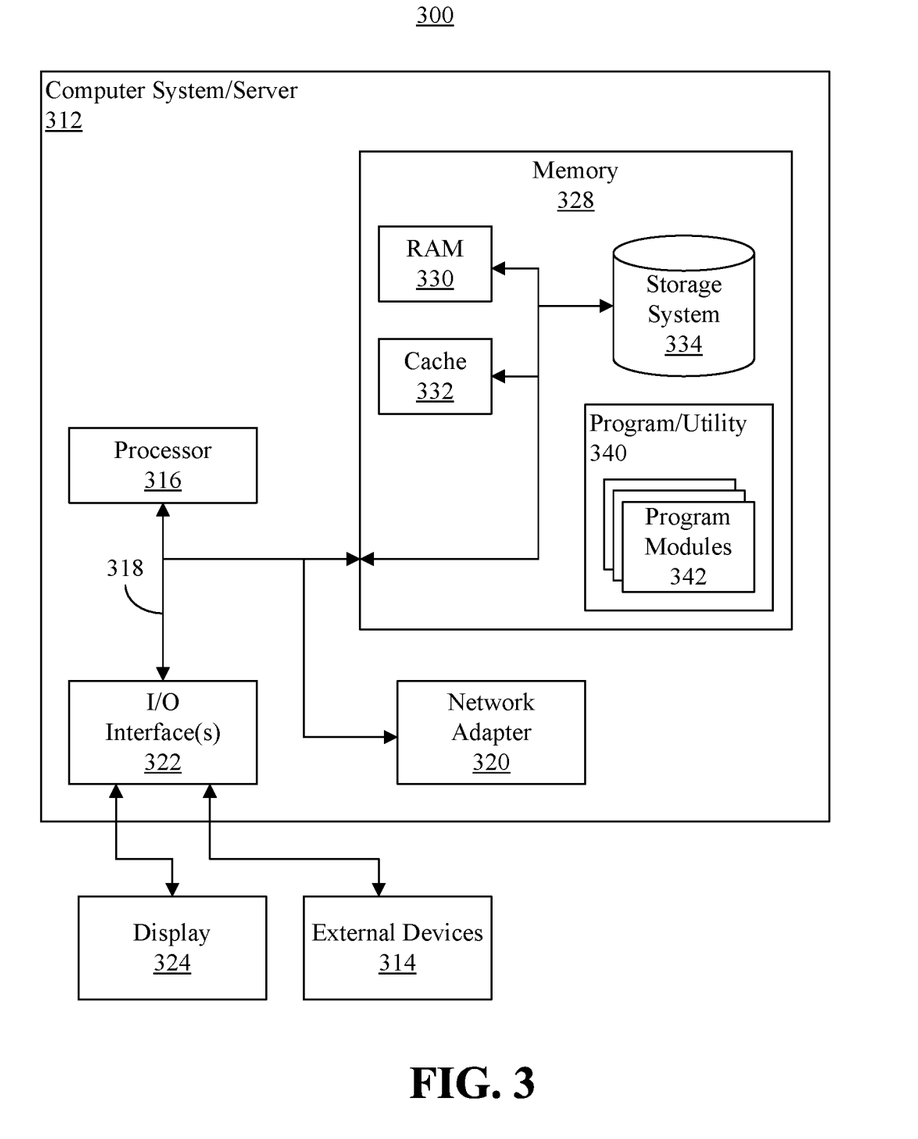
FIG. 3 depicts a cloud computing node according to an embodiment of the present invention.

FIG. 3 illustrates a schematic of an example cloud computing node. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

Cloud computing node 300 includes a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system.

Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 300 is shown in the form of a general-purpose computing device. The components of computer system/server 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and it includes both volatile and non-volatile media, removable and non-removable media.

Memory 328 can include computer system readable media in the form of volatile memory, such as random access memory (RAM) 330 and/or cache memory 332. Computer system/server 312 may further include other removable/non-removable, volatile/non-volatile computer system storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328. By way of example, and not limitation, memory 328 can also store an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

For example, one or more of the program modules may implement group chat modeling system 96 or portions thereof. Program/utility 340 is executable by processing unit 316. Program/utility 340 and any data items used, generated, and/or operated upon by node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

While node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Figure 4:
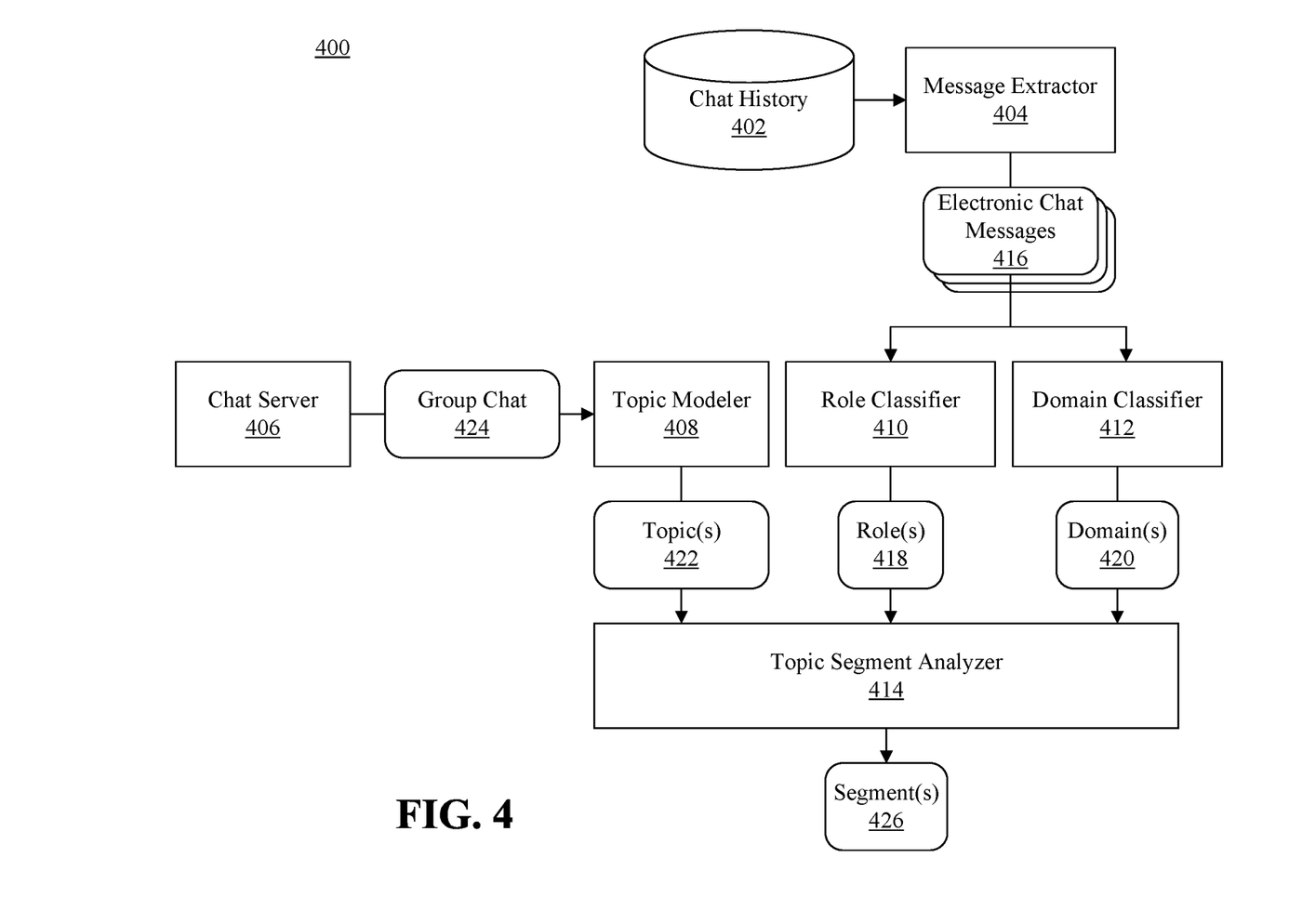
FIG. 4 illustrates an architecture for determining segments of interest within group chats according to an embodiment of the present invention.

FIG. 4 illustrates an example architecture 400 for determining segments of interest within group chats according to an embodiment of the present invention. Architecture 400 can be implemented within a computing environment the same as or similar to the computing environment described with reference to FIGS. 1 and/or 2 and further can be implemented within a computing system the same as or similar to the computing system described with reference to FIG. 3. In the example of FIG. 4, architecture 400 includes a chat history 402, a message extractor 404, a chat server 406, a topic modeler 408, a role classifier 410, a domain classifier 412, and a topic segment analyzer 414.

In the example of FIG. 4, the chat history 402 is a collection of electronic chat messages from a plurality of different group chats. The chat history 402 includes electronic chat messages from a plurality of different users across the different group chats. The participants in the group chats may vary from one group chat to the next. For example, the chat history 402 may be a chat history of group chats for an entire organization, for an entire social networking system, or the like. In the example of FIG. 4, the message extractor 404 is configured to locate or extract those electronic chat messages from the chat history 402 for a particular or selected user. As illustrated, the message extractor 404 has identified or extracted the electronic chat messages 416 from chat history 402 for the selected user.

Electronic chat messages 416 are for the selected user and are taken from across different group chats in which the selected user is a participant. In one or more embodiments, the electronic chat messages 416 are electronic chat messages that were sent by the selected user. In one or more other embodiments, the electronic chat messages 416 include electronic chat message sent by the selected user and can also include one or more electronic chat messages sent by other participants in response to an electronic chat message sent by the selected user.

The electronic chat messages 416 are used to train two different classifiers shown as the role classifier 410 and the domain classifier 412. The training that is performed results in the role classifier 410 being tailored to determine one or more roles 418 assumed by the selected user based upon electronic chat messages 416. The training further results in the domain classifier 412 being tailored to determine one or more domains of reference 420 (shown as "domain(s)" in FIG. 4) for the selected user based on the electronic chat messages 416.

The role classifier 410 and the domain classifier 412 may be implemented using any of a variety of classification techniques. Examples of classification techniques that may be used to implement the role classifier 410 and the domain classifier 412 can include, but are not limited to, support vector machine, decision tree, and logistic regression. By using the role classifier 410 in the domain classifier 412, the system is capable of determining a more realistic and accurate estimation of the role(s) 418 and the domain(s) 420 for the selected user based on actual communications of the user as opposed to looking up an entry in a static database that may or may not be kept up to date over time. Further, by using the role classifier 410 and the domain classifier 412, the role(s) 418 and the domain(s) 420 determined for the selected user change over time with the changing flow of electronic chat messages 416 that are extracted and analyzed. It should be appreciated that once the role classifier 410 and the domain classifier 412 are initially trained, the determination of role(s) 418 and domain(s) 420 for the selected user may be determined continually, periodically, or from time to time. Thus, the role(s) 418 and/or domain(s) for a selected user can vary from one day to the next based on the extracted electronic chat messages 416 for the user.

As an illustrative and nonlimiting example, the role classifier 410 is capable of determining that the selected user's role is development operations engineer, data scientist, paralegal, manager, marketing, or the like. The role classifier 410 is capable of determining one or more roles 418 that the selected user performs based on the electronic chat messages 416. The domain classifier 412 is capable of determining that the selected user's domain(s) of reference is legal, medical, computer science, mathematics, or the like. Other more specific examples of domains of reference include virtualization, networking, and the like. The domain classifier 412 is capable of determining one or more domains 420 of the selected user based on the electronic chat messages 416. In this regard, both the roles and the domains of reference for the selected user are determined based upon the selected user's contributions to different group chats of which the user is a participant.

The topic modeler 408 is capable of inferring meaning and/or determining topics 422 from real time chat discourse occurring in one or more group chats. Topic modeler 408 is capable of processing group chats obtained from chat server 406. Chat server 406 may be a standalone chat server or part of a larger collaborative system. Chat server 406 may be part of a workplace chat system or part of another system such as a social networking system.

As defined herein, a "social networking system" is a computing platform, e.g., one or more interconnected computer systems, that allows users to build social networks or social relations among people who share similar interests, activities, backgrounds or real-life connections. Through a social networking system, users may send communications through different mechanisms such as by posting messages or other media, commenting on messages, posts, or other media, replying to messages, participating in group chats, and performing other operations such as "liking" a communication or item of media, sharing the communication or item of media, expressing an emotional sentiment, and so forth. In the context of a social networking system, actions such as posting, replying, chatting, liking, sharing, expressing sentiment, and so forth are programmatic actions that are monitored and persisted within social the networking system, e.g., within a data storage device in a data structure within and/or accessible by, the social networking system.

In one or more embodiments, cluster analysis can be used to train topic modeler 408. Examples of cluster-based techniques that can be used to train topic modeler 408 can include, but are not limited to, partition clustering, hierarchical clustering, density-based clustering, and the like. Other examples of techniques that can be used to implement topic modeler 408 include, but are not limited to, biterm topic modeling and Latent Dirichlet allocation. The topic modeler 408, unlike the role classifier 410 and the domain classifier 412, is capable of operating on conversations across a plurality of group chats to identify topics in the respective group chats. Thus, in particular embodiments, the topic modeler 408 can be trained using electronic chat messages from a plurality of different group chats and/or a plurality of different users.

In the example of FIG. 4, the topic modeler 408 is capable of processing electronic chat messages of group chat 424 obtained from chat server 406. While the topic modeler 408 is capable of determining topics 422 for each of a plurality of different conversations and performing the analysis in real time and/or in near real time, for purposes of illustration, conversation 424 is shown and is a group chat in which the selected user is a participant and for which role(s) 418 and domain(s) 420 have been determined. The selected user, however, may have been unable to participate in the group chat for a period of time, e.g., an hour, a day, several days, or the like.

The topic segment analyzer 414 is capable of receiving the topic(s) 422 output from the topic modeler 408, the role(s) 418 output from the role classifier 410, and the domain(s) 420 output from the domain classifier 412. The topic segment analyzer 414 is capable of determining segment(s) of interest 426 for the selected user from the group chat 424. The topic segment analyzer 414 is capable of determining one or more segments of interest 426 (shown as "segment(s)" in FIG. 4) for the selected user. Each segment 426 is made up of one or more electronic chat messages within group chat 424 that are deemed of interest to the selected user.

In one or more embodiments, the topic segment analyzer 414 is implemented as a neural network. The term "neural network," as used within this disclosure, means a programmatic description or definition of a neural network. The neural network programmatically defines parameters, connection weights, or other specifics of the architecture such as the number of neurons contained therein or the connectivity among the neurons. In one aspect, a neural network is specified using computer readable program instructions, e.g., as program code and data, stored in a computer readable storage medium. The neural network can be organized in a number of layers, where the output of a first layer can be fed as input to the next layer.

The neural network can be trained to a point where the weights of the neural network have converged or substantially converged to generate segments 426. In particular, a training process has determined a set of weights (e.g., convolution kernels) that provides the neural network with the desired input-output relationship to generate the segments 426 based on the received topics 422, roles 418, and domains 420. To this end, a learning process adjusts the weights of the neural network to change the input-output relationship so that an input-output accuracy cost function is optimized. Thus, the goal of a training process is to change the input-output relationship of the neural network.

Figure 5:
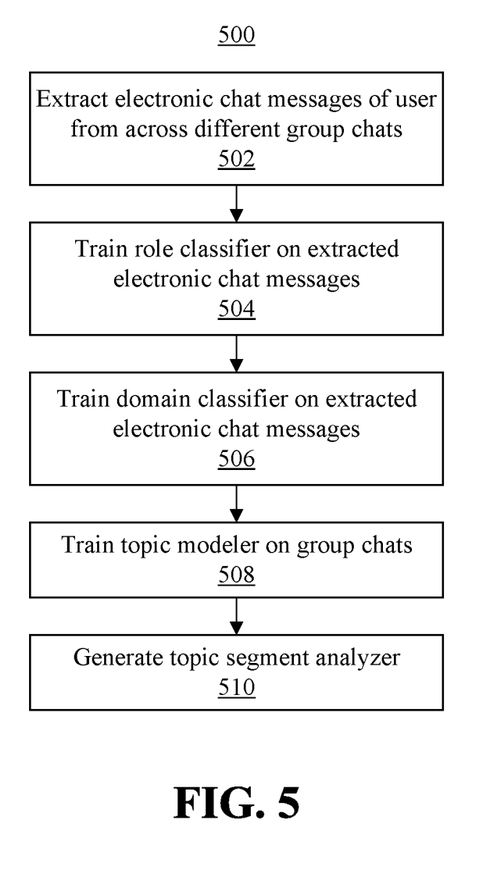
FIG. 5 illustrates a method of implementing a system for micro term modeling for real time chat discourse according to an embodiment of the present invention.

FIG. 5 illustrates a method 500 of implementing a system for micro term modeling for real time chat discourse according to an embodiment of the present invention. Method 500 can be performed by a system the same as or similar to the system described with reference to FIGS. 1-4.

In block 502, the system is capable of extracting electronic chat messages for a selected user from across a plurality of different group chats. For example, the system is capable of extracting electronic chat messages sent by the selected user from one or more different chat groups in which the selected user is a participant. In particular embodiments, the system is capable of also extracting electronic chat messages sent in reply to an electronic chat message sent by the selected user and/or electronic chat messages directed explicitly to the selected user.

In block 504, the role classifier is trained on the extracted electronic chat messages. In block 506, the domain classifier is trained on the extracted electronic chat messages. In block 508, topic modeler is trained on one or more different group chats. The domain classifier can be trained on a plurality of different group chats of which the selected user may or may not be a participant. In block 510, a topic segment analyzer is generated that operates on output from the role classifier, the domain classifier, and the topic modeler. As discussed, in particular embodiments, the topic segment analyzer is implemented as a neural network.

Figure 6:
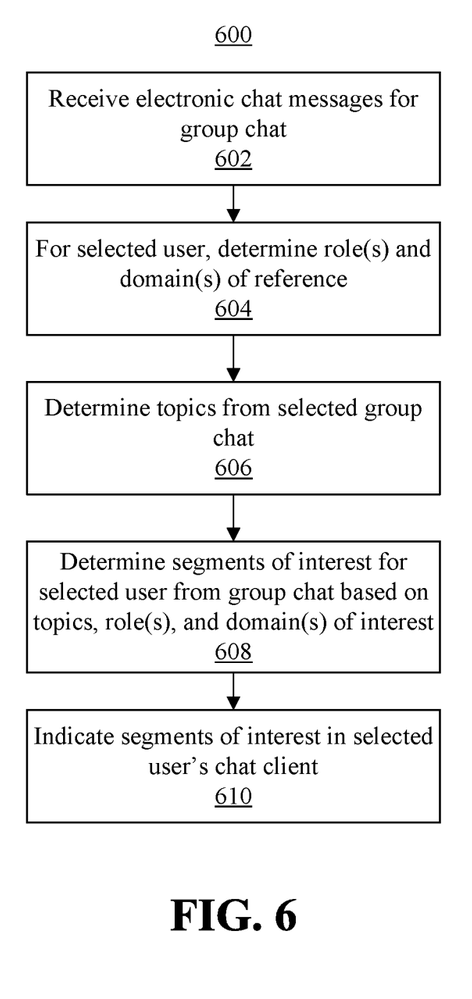
FIG. 6 illustrates a method of processing group chats to determine segments of interest for a user according to an embodiment of the present invention.

FIG. 6 illustrates a method 600 of processing group chats to determine segments of interest for a user according to an embodiment of the present invention. Method 600 can be implemented by a system the same as or similar to the system described with reference to FIGS. 1-4.

In block 602, the system receives electronic chat messages for a group chat. In one or more embodiments, the system is capable of processing chat messages for the group chat in real time and/or in near real time. In one or more other embodiments, the system is capable of processing prior electronic chat messages of the group chat and recent electronic chat messages in the group chat.

In block 604, the system determines one or more roles and one or more domains of interest for a selected user that is a participant in the group chat. As discussed, the system is capable of determining the role(s) of the selected using the role classifier and determining the domain(s) of interest of the user using the domain classifier. In particular embodiments, where the system has previously determined the role(s) and/or domain(s) for the user within a predetermined amount of time in the past, the system may retrieve previously stored role(s) and/or domain(s). In other embodiments, the system is capable of determining the role(s) and/or domain(s) for the selected user anew and/or updating previously determined role(s) and/or domain(s). It should be appreciated that the role classifier and the domain classifier can also be updated, e.g., continually trained, over time.

In block 606, the system determines one or more topics from the selected group chat. The system, for example, executes the topic modeler to determine topics from the selected group chat. In block 608, the system determines one or more segments of interest for the selected user from the group chat based on the topics, roles, and domains of interest for the user. For example, the system executes the topic segment modeler to determine the segments of interest for the selected user. In block 610, the system indicates the segments of interest in the selected user's chat client.

Figure 7:
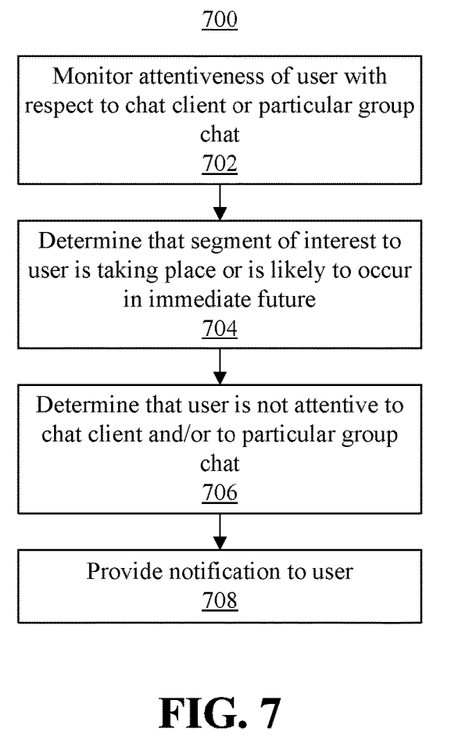
FIG. 7 illustrates another method of processing group chats to determine segments of interest for a user according to an embodiment of the present invention.

FIG. 7 illustrates another method 700 of processing group chats to determine segments of interest for a user according to an embodiment of the present invention. Method 700 can be implemented by a system the same as or similar to the system described with reference to FIGS. 1-4.

In block 702 the system monitors attentiveness of a user with respect to a chat client and/or a particular group chat. In one or more embodiments, the system is capable of performing gaze detection to determine the focus of a user's gaze. For example, the user's device can include a forward facing camera to capture images of the user while using the device. Using image processing techniques, the system is capable of detecting the focus of the user's gaze to determine where in space the user is looking. Using gaze detection, the system is capable of determining whether the user is looking at the display screen of the user's device and/or looking at a particular location on the display screen such as where the chat client is located and displayed. In one example, the chat client is configured to perform the gaze detection described and provide location information for the user's gaze to a centralized system as described in connection with FIGS. 1-4. In another example, the chat client is configured to send image data captured by the forward facing camera to the centralized system and location data indicating where the chat client window or interface is displayed on the display screen of the user's device. In that case, the centralized system is capable of performing image processing to determine whether the user is looking and whether the user is looking at the display screen of the user's device and/or the chat application on the display screen of the user's device. In one or more other embodiments, the user's device is capable of determining whether the chat client application has focus, is the active window on the user's device, and/or obscured by one or more other windows. In particular embodiments, the user's device is capable of determining which group chat in the chat client application has focus or is selected. The user's device is capable of making local determinations as to whether the user is attentive or send the described data to another system to make the determination.

In block 704, the system determines that a segment of interest to the user is currently taking place or is likely to occur in the immediate future. For example, the system is capable of determining that a segment of interest has just occurred, is still occurring, or is likely to occur in the immediate future based upon an analysis of prior electronic chat messages in the group chat.

In block 706, the system determines that the user is not attentive to the chat client and/or to a particular group chat. Examples where the system determines that the user is not attentive to the chat client application and/or to a particular group chat include determining that the user is not looking at the display screen of the user's device; determining that while the user is looking at the display screen of the user's device, the user is not looking at the location of the chat client application displayed on the display screen of the user's device; determining that the chat client application does not have focus; determining that the chat client application is covered by one or more other windows or at least partially obstructed by other elements displayed on the display screen of the user's device; or determining that a particular group chat that the system determines has a segment of interest taking place or is likely to occur in the immediate future is not the selected or active group chat in the chat client application.

In block 708, the system provides a notification to the user. The system is capable of providing any of a variety of visual messages, audible messages, or haptic feedback to the user indicating that the user should turn their attention to the chat client application and/or to a particular chat group of the chat client application.

Figure 8:
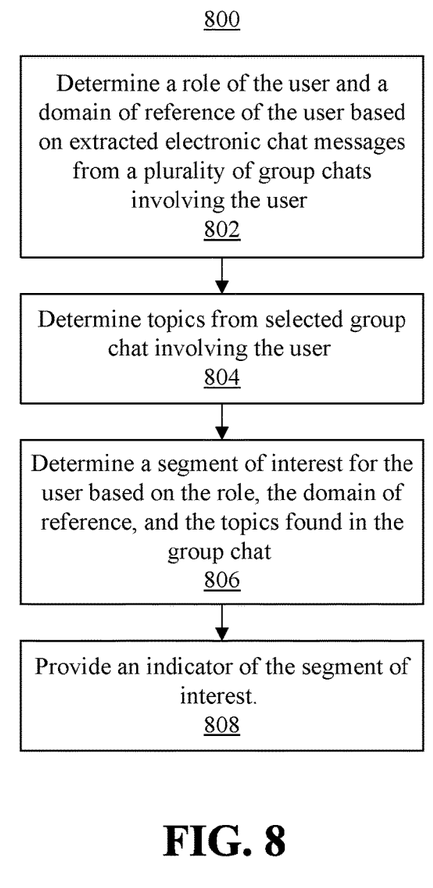
FIG. 8 illustrates another method of processing group chats to determine segments of interest for a user according to an embodiment of the present invention.

FIG. 8 illustrates another method 800 of processing group chats to determine segments of interest for a user according to an embodiment of the present invention. Method 800 can be performed by a system the same as or similar to the system described with reference to FIGS. 1-4.

In block 802, the system determines a role of the user and a domain of reference of the user based on extracted electronic chat messages from a plurality of group chats involving the user. As discussed, the system is capable of extracting the electronic chat messages of the user from a plurality of group chats in which the user is a participant. The system processes the extracted electronic chat messages through a role classifier and a domain classifier.

In block 804, the system determines topics from the selected group chat involving the user. The system determines topics using the topic modeler. In block 806, the system determines a segment of interest to the user based on the role, the domain of reference, and the topics found in the selected chat session. The system is capable of generating a topic segment model configured to correlate the topics found in the selected group chat with the role of the user and the domain of the user. The system is capable of processing the electronic chat messages of the selected group chat through the topic segment model to determine the segment of interest.

In block 808, the system provides an indicator of the segment of interest. In one or more embodiments, the chat client application the user displays the indicator of the segment of interest. The indicator(s) visually indicate the segment of interest of the selected group chat within a chat client application of the user.

In one or more embodiments, the segment of interest is one of a plurality of segments of interest determined from the selected conversation. Accordingly, the system is capable of providing an indicator by generating a summary of the selected group chat including only the plurality of segments of interest. In another example, the system is capable of collapsing parts of the group chat to display only those electronic chat messages that are part of a segment of interest to the user. The user's chat client application, e.g., based on signals provided from the system, displays those conversations of the group chat that are of interest to the user (e.g., the segments of interest).

In one or more other embodiments, the system is capable of generating a notification to the user based on a prediction that a future electronic chat message of the selected group chat or a current electronic chat message of the selected group chat is of interest to the user. In particular embodiments, the notification is only generated in response to detecting inattentiveness of the user.

In some embodiments, the system is capable of determining that a future scheduled conversation of a group chat is of interest to the user based on the role of the user, the domain of the user, and a topic determined from the future scheduled chat session and indicating that the future scheduled chat session is of interest to the user.

In one or more other embodiments, the domains of interest and roles determined for users can be provided to a machine learning data processing system that is capable of generalizing the classifiers across a wider sampling of users to generalize the results. This relieves the system from having to perform an in-depth analysis of each user of the chat system to develop user-specific classifiers. This technique allows the system to achieve an outcome across a wider group of individuals or a team in less time, thereby avoiding the "cold start" problem.

While the system is capable of indicating particular segments of interest to the user, in other embodiments, the system is capable of identifying segments of varying interest to the user. For example, the system is capable of ranking segments of interest based upon scoring determined by the topic segment modeler. The system is capable of indicating primary segments of interest for highest scoring segments (e.g., 0.75-0.9), indicating secondary segments of interest for segments with scores between 0.50 up to 0.75, and so on. In other examples, the system is capable of applying a cut-off threshold for the score to limit what is considered a segment of interest.

Figure 9:
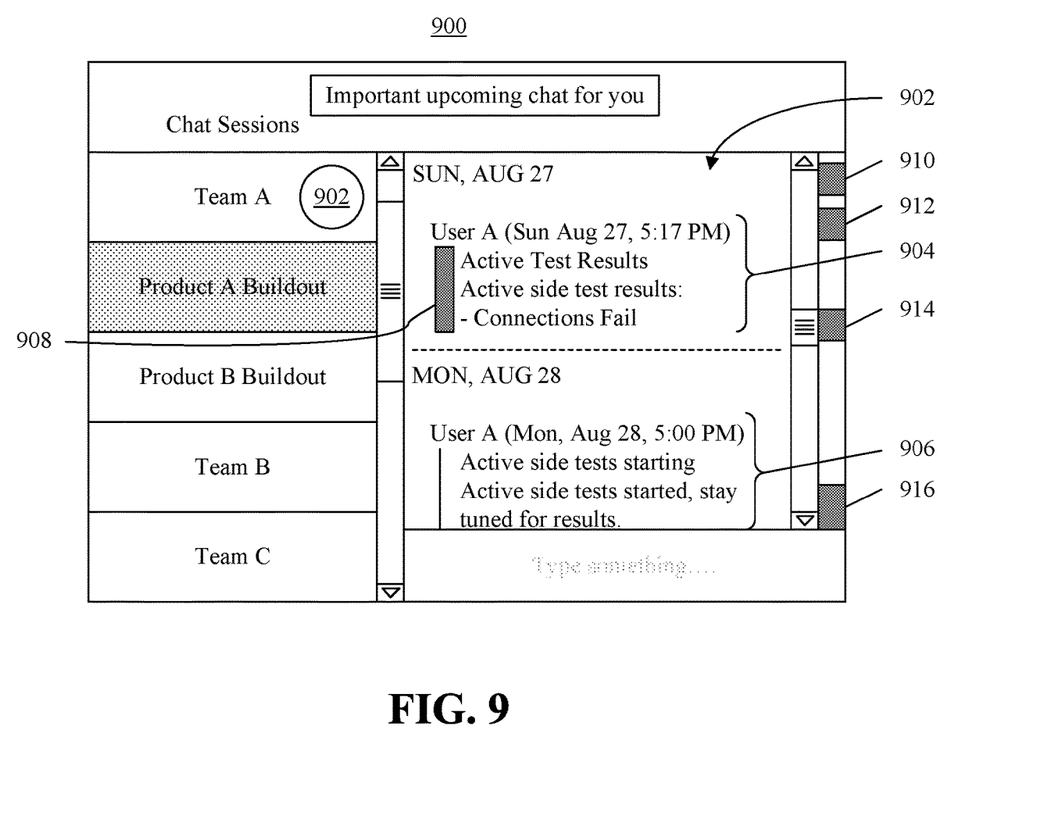
FIG. 9 is a graphical user interface (GUI) for a client chat application according to an embodiment of the present invention.

FIG. 9 is a graphical user interface (GUI) 900 for a client chat application according to an embodiment of the present invention. GUI 900 can be used whether the chat client application is a browser-based application or a standalone or dedicated chat client application. In the example of FIG. 9, the GUI 900 lists a plurality of group chats called "Team A", "Product A Buildout", "Product B Buildout", "Team B", and "Team C". For purpose of illustration, the group chat called "Product A Buildout" is selected. Accordingly, the electronic chat messages displayed in region 902 belong to the "Product A Buildout" group chat. Region 902 shows electronic chat messages 904 and 906.

In the example of FIG. 9, the system has determined one or more different segments of interest for a selected user. The system is capable of creating a visual overlay and/or displaying one or more graphical elements indicating different segments of interest. For example, the system has determined that electronic chat message 904 is part of a segment of interest for the selected user. Accordingly, in response to the determination, message 904 is displayed with an enhanced indicator 908 indicating that electronic chat message 904 is part of a segment of interest for the user.

In the example of FIG. 9, an additional region to the right of the scroll control for region 902 is displayed that includes one or more indicators of segments of interests for the selected group chat. For example, group chat application displays indicators 910, 912, 914, and 916 each indicating a segment of interest for the selected group chat. In particular embodiments, selection of anyone of indicators 910, 912, 914, or 916 causes the group chat application to navigate to the corresponding location within the group chat to display one or more of the electronic chat messages included in the selected segment of interest.

The example of FIG. 9 illustrates another aspect where the system has determined that the group chat called "Team A" includes one or more electronic chat messages of interest to the user and/or is predicted to include one or more electronic chat messages of interest to the user. Accordingly, the notification 918 is displayed giving the user notice that the system has determined that the "Team A" group chat has been determined to be is of interest to the user. In addition, the user's chat client application is providing a message of "Important upcoming chat for you" to the user indicating that the system has predicted that the "Team A" chat that is approaching, in the near future, is likely of interest to the user. This feature, e.g., notifying the user of an upcoming group chat predicted to be of interest or notifying the user that the current state of a group chat is of interest can be helpful in cases where the user is attempting to multitask and is unable to provide full attention to the chat client application.

For purposes of illustration, consider the case where the user of the chat client application illustrated in FIG. 9 is a technical person. In that case, the conversation taking place in region 902 for the selected group chat may involve many different users involved in a product. the conversation may include topics relating to marketing, customer support, new features, bugs, and the like. The inventive arrangements described herein allow the user to focus on those portions of the conversation that are relevant to the user. The user need not read through hours or days of conversation unrelated to the user's area of interest (e.g., domain) to find the significant portions of the conversation.

While the embodiments described herein are described largely using examples from the workplace, as noted, the inventive arrangements can be used in other contexts. In social situations, for example, the system is capable of using the same techniques to determine segments of interest for social users. As an illustrative and nonlimiting example, the system can be applied to a chat group to inform a user of segments of interest where the user's favorite sports team was discussed. In this example, the role of the user may be "sports fan of team A of sport X". The role of the person may also be defined in terms of the person's geographic location to choose domains of interest based on location (e.g., sport teams, weather, and the like).

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
determining, using computer hardware, a role of a user and a domain of reference of the user based on electronic chat messages for the user across a plurality of group chats;
determining, using the computer hardware, topics from a selected group chat in which the user is a participant;
determining, using the computer hardware and from the selected group chat, a segment of interest to the user based on the role, the domain of reference, and the topics found in the selected group chat;
generating a notification to the user based on a prediction that a future electronic chat message of the selected group chat is of interest to the user, and the notification is only generated in response to detecting inattentiveness of the user; and
providing, using the computer hardware and with a graphical user interface, an indicator of the segment of interest, wherein
the domain of reference is an area or a subject matter expertise, skill, or experience for the user.

2. The method of claim 1, wherein
the providing the indicator comprises:
visually indicating the segment of interest of the selected group chat within a chat client application of the user.

3. The method of claim 1, further comprising:
generating a topic segment model configured to correlate the topics found in the selected group chat with the role of the user and the domain of reference of the user; and
processing electronic chat messages of the selected group chat through the topic segment model to determine the segment of interest.

4. The method of claim 1, wherein
the segment of interest is one of a plurality of segments of interest determined from the selected group chat, wherein
the providing the indicator further comprises:
generating a summary of the selected group chat including only the plurality of segments of interest.

5. The method of claim 1, further comprising:
determining that a future scheduled conversation of a further group chat is of interest to the user based on the role of the user, the domain of reference of the user, and a topic determined from the future scheduled chat session; and
indicating that the future scheduled chat session is of interest to the user.

6. The method of claim 1, further comprising:
extracting the electronic chat messages of the user from a plurality of group chats in which the user is a participant.

7. A system, comprising:
a processor configured to initiate executable operations including:
determining a role of a user and a domain of reference of the user based on electronic chat messages for the user across a plurality of group chats;
determining topics from a selected group chat in which the user is a participant;
determining, from the selected group chat, a segment of interest to the user based on the role, the domain of reference, and the topics found in the selected group chat;
generating a notification to the user based on a prediction that a future electronic chat message of the selected group chat is of interest to the user, and the notification is only generated in response to detecting inattentiveness of the user; and
providing, using the computer hardware and with a graphical user interface, an indicator of the segment of interest, wherein
the domain of reference is an area or a subject matter expertise, skill, or experience for the user.

8. The system of claim 7, wherein
the providing the indicator comprises:
visually indicating the segment of interest of the selected group chat within a chat client application of the user.

9. The system of claim 7, wherein
the processor is configured to initiate executable operations further comprising:
generating a topic segment model configured to correlate the topics found in the selected group chat with the role of the user and the domain of reference of the user; and
processing electronic chat messages of the selected group chat through the topic segment model to determine the segment of interest.

10. The system of claim 7, wherein
the segment of interest is one of a plurality of segments of interest determined from the selected group chat, wherein
the providing the indicator further comprises:
generating a summary of the selected group chat including only the plurality of segments of interest.

11. The system of claim 7, wherein
the processor is configured to initiate executable operations further comprising:
determining that a future scheduled conversation of a further group chat is of interest to the user based on the role of the user, the domain of reference of the user, and a topic determined from the future scheduled chat session; and
indicating that the future scheduled chat session is of interest to the user.

12. The system of claim 7, wherein
the processor is configured to initiate executable operations further comprising:
extracting the electronic chat messages of the user from a plurality of group chats in which the user is a participant.

13. A computer program product comprising a computer readable storage medium having program instructions embodied therewith, the program instructions executable by a processor to cause the processor to initiate executable operations comprising:
determining a role of a user and a domain of reference of the user based on electronic chat messages for the user across a plurality of group chats;
determining topics from a selected group chat in which the user is a participant;
determining, from the selected group chat, a segment of interest to the user based on the role, the domain of reference, and the topics found in the selected group chat;
generating a notification to the user based on a prediction that a future electronic chat message of the selected group chat is of interest to the user, and the notification is only generated in response to detecting inattentiveness of the user; and
providing, using the computer hardware and with a graphical user interface, an indicator of the segment of interest, wherein
the domain of reference is an area or a subject matter expertise, skill, or experience for the user.

14. The computer program product of claim 13, wherein
the providing the indicator comprises:
visually indicating the segment of interest of the selected group chat within a chat client of the user.

15. The computer program product of claim 13, wherein
the instructions are executable by the processor to cause the processor to initiate executable operations comprising:
generating a topic segment model configured to correlate the topics found in the selected group chat with the role of the user and the domain of reference of the user; and
processing electronic chat messages of the selected group chat through the topic segment model to determine the segment of interest.

* * * * *